(12) United States Patent
Komuro et al.

(10) Patent No.: US 8,998,728 B2
(45) Date of Patent: Apr. 7, 2015

(54) TORQUE FLUCTUATION ABSORBER

(71) Applicant: Aisin Seiki Kabushiki Kaisha, Kariya-shi (JP)

(72) Inventors: Makoto Komuro, Kariya (JP); Suguru Jimbo, Tokai (JP); Yoshitaka Inoshita, Chita-gun (JP); Hayato Mori, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/018,777

(22) Filed: Sep. 5, 2013

(65) Prior Publication Data

US 2014/0087890 A1    Mar. 27, 2014

(30) Foreign Application Priority Data

Sep. 24, 2012 (JP) ................................. 2012-209233

(51) Int. Cl.
*F16F 15/129* (2006.01)
*F16D 3/14* (2006.01)

(52) U.S. Cl.
CPC .............. *F16D 3/14* (2013.01); *F16F 15/1292* (2013.01)

(58) Field of Classification Search
USPC .............. 464/68.4, 68.41; 192/210.1, 213.12, 192/213.22, 213.31, 214.1; 74/574.3; 267/160, 161, 164
See application file for complete search history.

(56) References Cited

U.S. PATENT DOCUMENTS

| | | | | |
|---|---|---|---|---|
| 4,583,959 | A | * | 4/1986 | Yoneda ....................... 464/68.41 |
| 4,697,682 | A | * | 10/1987 | Alas et al. .................. 464/68.41 |
| 4,993,530 | A | | 2/1991 | Maki |
| 2007/0191120 | A1 | | 8/2007 | Saeki et al. |
| 2007/0218347 | A1 | | 9/2007 | Takahashi et al. |
| 2008/0210049 | A1 | * | 9/2008 | Rohs ........................... 74/574.3 |

FOREIGN PATENT DOCUMENTS

| | | | |
|---|---|---|---|
| DE | 34 29 705 A1 | * | 7/1985 |
| JP | 45-27486 | * | 9/1970 |
| JP | 58-000637 A | | 1/1983 |
| JP | 1-158225 A | | 6/1989 |
| JP | 2007-218347 A | | 8/2007 |
| JP | 2012-042060 A | | 3/2012 |
| WO | WO 2011/060752 A1 | | 5/2011 |

* cited by examiner

*Primary Examiner* — Gregory Binda
(74) *Attorney, Agent, or Firm* — Buchanan Ingersoll & Rooney PC

(57) ABSTRACT

A torque fluctuation absorber includes a first rotating member, a second rotating member arranged coaxially with the first rotating member, a control plate arranged between the first rotating member and the second rotating member in an axial direction and engaging non-rotatably with the second rotating member, a thrust member arranged between the first rotating member and the control plate in the axial direction, engaging with the first rotating member in an axially movable and non-rotatable manner, and slidably making contact with the control plate, and an elastic member arranged between the first rotating member and the thrust member in the axial direction, supported by the first rotating member and pressing the thrust member against the control plate.

6 Claims, 11 Drawing Sheets

F I G. 4 A
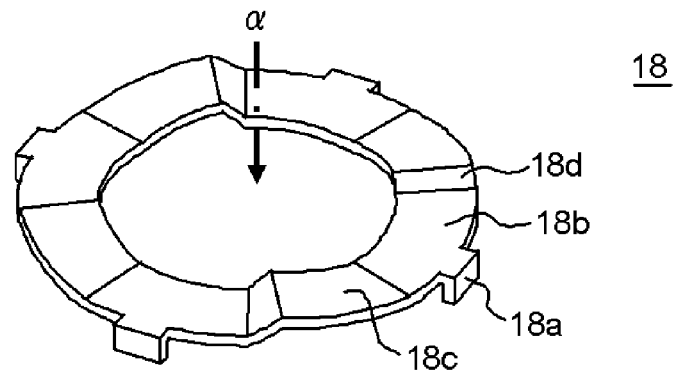
F I G. 4 B
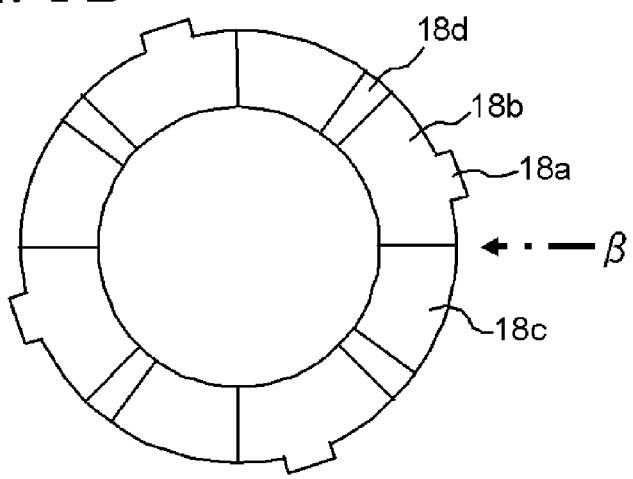
F I G. 4 C
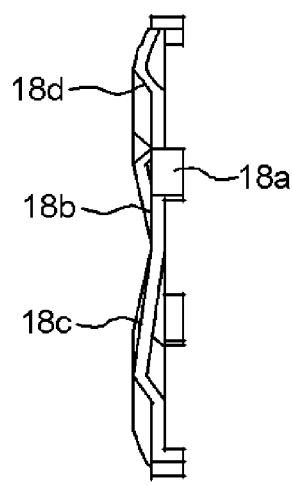

TORQUE FLUCTUATION ABSORBER

CROSS REFERENCE TO RELATED APPLICATIONS

This application is based on and claims priority under 35 U.S.C. §119 to Japanese Patent Application 2012-209233, filed on Sep. 24, 2012, the entire content of which is incorporated herein by reference.

TECHNICAL FIELD

This disclosure generally relates to a torque fluctuation absorber.

BACKGROUND DISCUSSION

A known torque fluctuation absorber is arranged on a power transmission path between an engine and a transmission, and absorbs (decreases or restricts) torque fluctuations generated between the engine and the transmission. The torque fluctuation absorber may include a hysteresis mechanism for absorbing the torque fluctuations by means of a hysteresis torque generated by a frictional force. At the hysteresis mechanism, a thrust member arranged between two rotating members in an axial direction is pressed against one of the rotating members by means of a disc spring. In a case where a torsion is generated between the mentioned two rotating members, the torque fluctuations are absorbed by means of the hysteresis torque generated by the frictional force between the thrust member and the mentioned one of the rotating members. Such hysteresis mechanism may also include a mechanism (variable hysteresis mechanism) which changes the hysteresis torque in accordance with a torsion angle between two rotating members.

A known clutch disc including the variable hysteresis mechanism is disclosed in JPS58-637A (hereinafter referred to as Patent reference 1). According to the construction disclosed in Patent reference 1, in a case where a torsion is generated between conducting plate members and a clutch hub, the variable hysteresis mechanism shifts a control member in an axial direction. The control member has a cam face which makes contact with and engages with a contact-sliding member formed at one of the conducting plate members. Then, a load of an elastic member arranged between a flange portion of the clutch hub and the control member is changed, and accordingly, a frictional force of a friction member arranged between the flange portion of the clutch hub and the conducting plate member is changed. Thus, the variable hysteresis mechanism changes a hysteresis torque.

Another known clutch disc including the variable hysteresis mechanism is disclosed in JPH1-158225A (hereinafter referred to as Patent reference 2). In a case where a torsion is generated between disc members and a hub member, according to the construction disclosed in Patent reference 2, the variable hysteresis mechanism changes a load of a spring member having protruding portions which slidably make contact with a cam face formed at a plate member, and accordingly, a frictional force of a friction member pressed against a hub member by a spring member is changed. Thus, the variable hysteresis mechanism changes a hysteresis torque.

A known torque fluctuation absorber is disclosed in JP2007-218347A (hereinafter referred to as Patent reference 3). The torque fluctuation absorber, according to Patent reference 3, includes a first hysteresis mechanism configuring with side plates and a hub and generating a smaller hysteresis by biasing low friction members towards the side plates or towards the hub within a rotation allowance space where the side plates and the hub are allowed to rotate, and a second hysteresis mechanism generating a larger hysteresis by biasing high friction members towards the side plates or the hub out of the movement and rotation allowance space.

Another known clutch disc including the variable hysteresis mechanism is disclosed in WO2011060752 pamphlet (hereinafter referred to as Patent reference 4). In a case where a torsion is generated between disc members and an inertial body, according to the construction of Patent reference 4, the variable hysteresis mechanism shifts one of two inclined surface members frictionally engaged with one another in an axial direction. Then, a load applied to a spring arranged between one of the inclined surface members and the disc member is changed, and accordingly, a frictional force generated between the mentioned two inclined surface members is changed. Thus, the variable hysteresis mechanism changes a hysteresis torque.

According to the variable hysteresis mechanism described in the Patent reference 1, the frictional force generated between the contact sliding member and the cam face, serving as a cam mechanism, rarely changes, and substantially, only the frictional force of the friction member arranged between the flange portion of the clutch hub and the conducting plate member changes. Thus, it may be difficult to generate a large hysteresis torque.

According to the variable hysteresis mechanism described in the Patent reference 2, it may be difficult to maintain a strength of the variable hysteresis mechanism against an excessive torque because a cam mechanism is arranged at the spring member which has a bending characteristic.

According to the variable hysteresis mechanism described in the Patent reference 3, the variable hysteresis mechanism is configured such that the hysteresis torque changes in accordance with a change in torque fluctuations that are absorbed within the rotation allowance space, or out of the rotation allowance space. Thus, it is difficult to change the hysteresis torque smoothly.

According to the variable hysteresis mechanism described in the Patent reference 4, the hysteresis torque generated by a torsion angle between the disc member and the inertial body is symmetric (symmetric with respect to point, see FIG. 11) irrespective of a torsion direction. Thus, the variable hysteresis mechanism is not suitable for a device in which a torsion characteristic should be changed in accordance with the torsion direction and the torsion angle.

A need thus exists for a torque fluctuation absorber which is not susceptible to the drawback mentioned above.

SUMMARY

According to an aspect of this disclosure, a torque fluctuation absorber includes a first rotating member, a second rotating member arranged coaxially with the first rotating member, a control plate arranged between the first rotating member and the second rotating member in an axial direction and engaging non-rotatably with the second rotating member, and a thrust member arranged between the first rotating member and the control plate in the axial direction, engaging with the first rotating member in an axially movable and non-rotatable manner, and slidably making contact with the control plate. The torque fluctuation absorber further includes an elastic member arranged between the first rotating member and the thrust member in the axial direction, supported by the first rotating member and pressing the thrust member against the control plate. Each sliding surface of the thrust member and the control plate is formed in a predetermined shape to axially displace the thrust member relative to the control plate, to change a pressure load of the elastic member, and to change, or vary a hysteresis value generated between the thrust member and the control plate when a torsion is generated between the thrust member and the control plate.

BRIEF DESCRIPTION OF THE DRAWINGS

The foregoing and additional features and characteristics of this disclosure will become more apparent from the following detailed description considered with the reference to the accompanying drawings, wherein:

FIG. 4A is a perspective view schematically illustrating a structure of a control plate of the torque fluctuation absorber according to the first embodiment disclosed here;

FIG. 4B is a plan view seen from a direction of an arrow in FIG. 4A schematically illustrating the structure of the control plate of the torque fluctuation absorber according to the first embodiment;

FIG. 4C is a side view seen from a direction of an arrow in FIG. 4B schematically illustrating the structure of the control plate of the torque fluctuation absorber according to the first embodiment;

DETAILED DESCRIPTION

Figure 1:
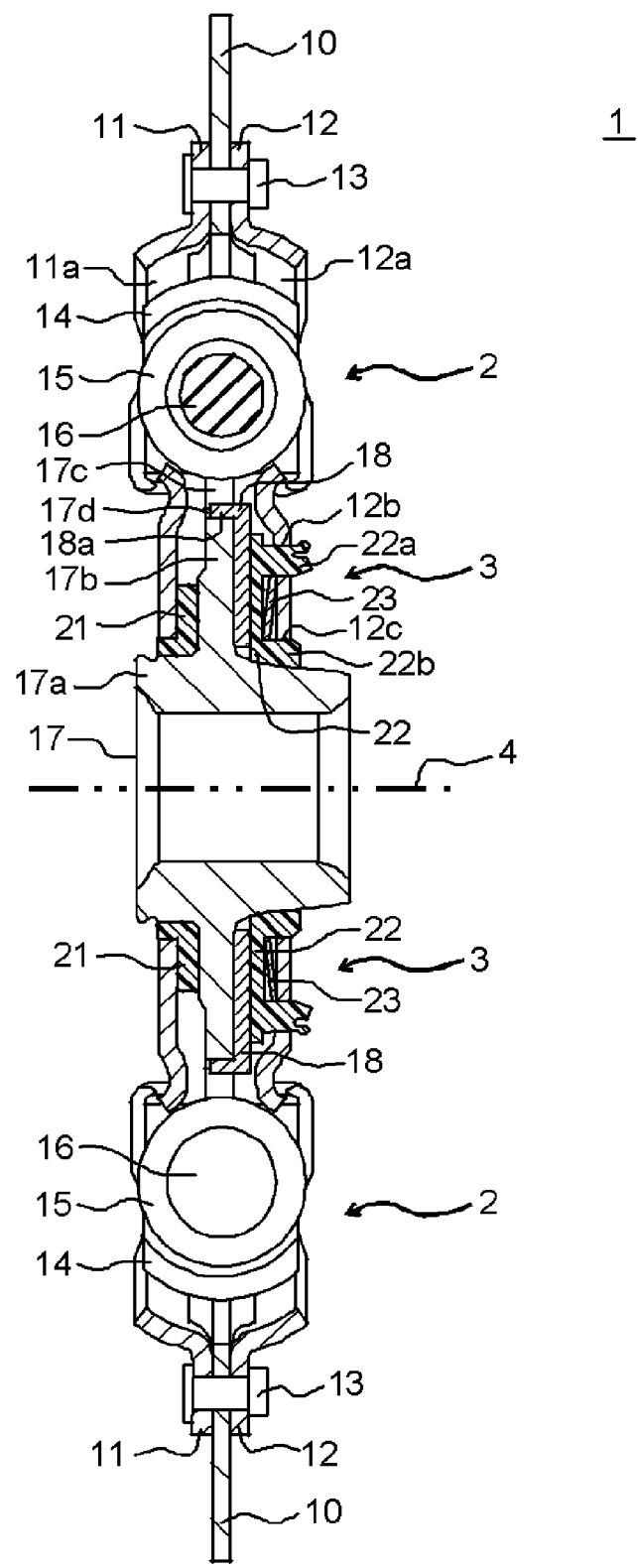
FIG. 1 is a cross-sectional view taken along the line I-I in FIG. 2 schematically illustrating a structure of a torque fluctuation absorber according to a first embodiment disclosed here.

A torque fluctuation absorber 1 according to an embodiment includes a second side plate 12 (serving as a first rotating member, FIG. 1), a hub member 17 (serving as a second rotating member, FIG. 1) arranged coaxially with the second side plate 12, a control plate 18 (FIG. 1) arranged between the second side plate 12 and the hub member 17 in an axial direction and engaging non-rotatably with the hub member 17, a second thrust member 22 (serving as a thrust member, FIG. 1) arranged between the second side plate 12 and the control plate 18 in the axial direction, engaging with the second side plate 12 in an axially movable and non-rotatable manner, and slidably making contact with the control plate 18, and a disc spring 23 (serving as an elastic member, FIG. 1) arranged between the second side plate 12 and the second thrust member 22 in the axial direction, supported by the second side plate 12 and pressing the second thrust member 22 toward the control plate 18. Each sliding surface of the second thrust member 22 and the control plate 18 is formed in a predetermined shape to axially displace the second thrust member 22 relative to the control plate 18, and accordingly, a pressure load of the disc spring 23 is changed. Thus, a hysteresis value (a hysteresis torque) generated between the second thrust member 22 and the control plate 18 is changed, or varied when a torsion is generated between the second thrust member and the control plate 18.

In this specification, reference numerals used for referring to drawings serve to facilitate understanding and are not for limiting to the forms of application in the drawings. The torque fluctuation absorber 1 of the embodiment will be described with reference to the drawings.

The torque fluctuation absorber 1 of a first embodiment will be described with reference to FIGS. 1 to 5.

Figure 2:
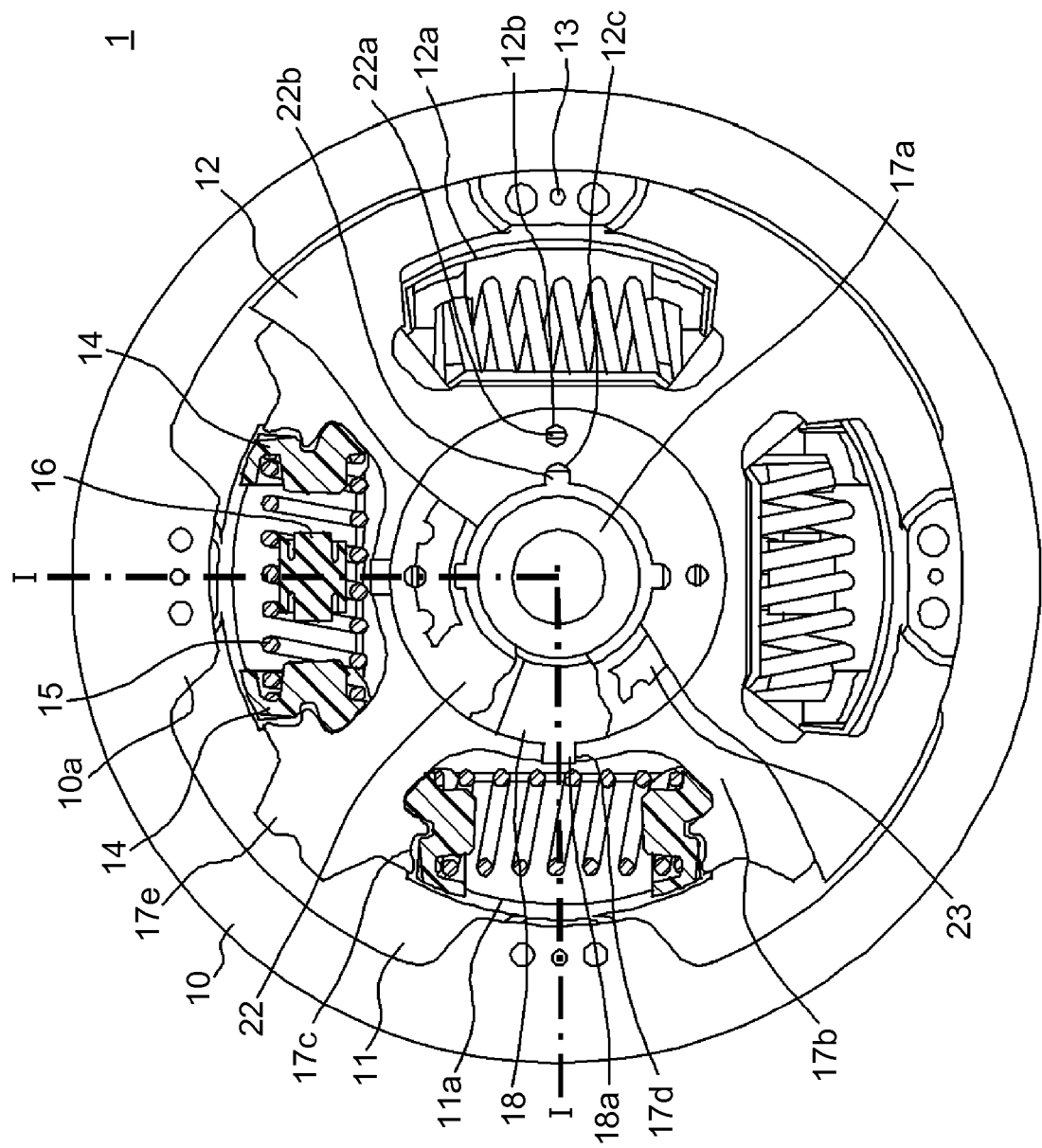
FIG. 2 is a partially cut-out plan view seen from an axial direction schematically illustrating the structure of the torque fluctuation absorber according to the first embodiment disclosed here.
Figure 3:
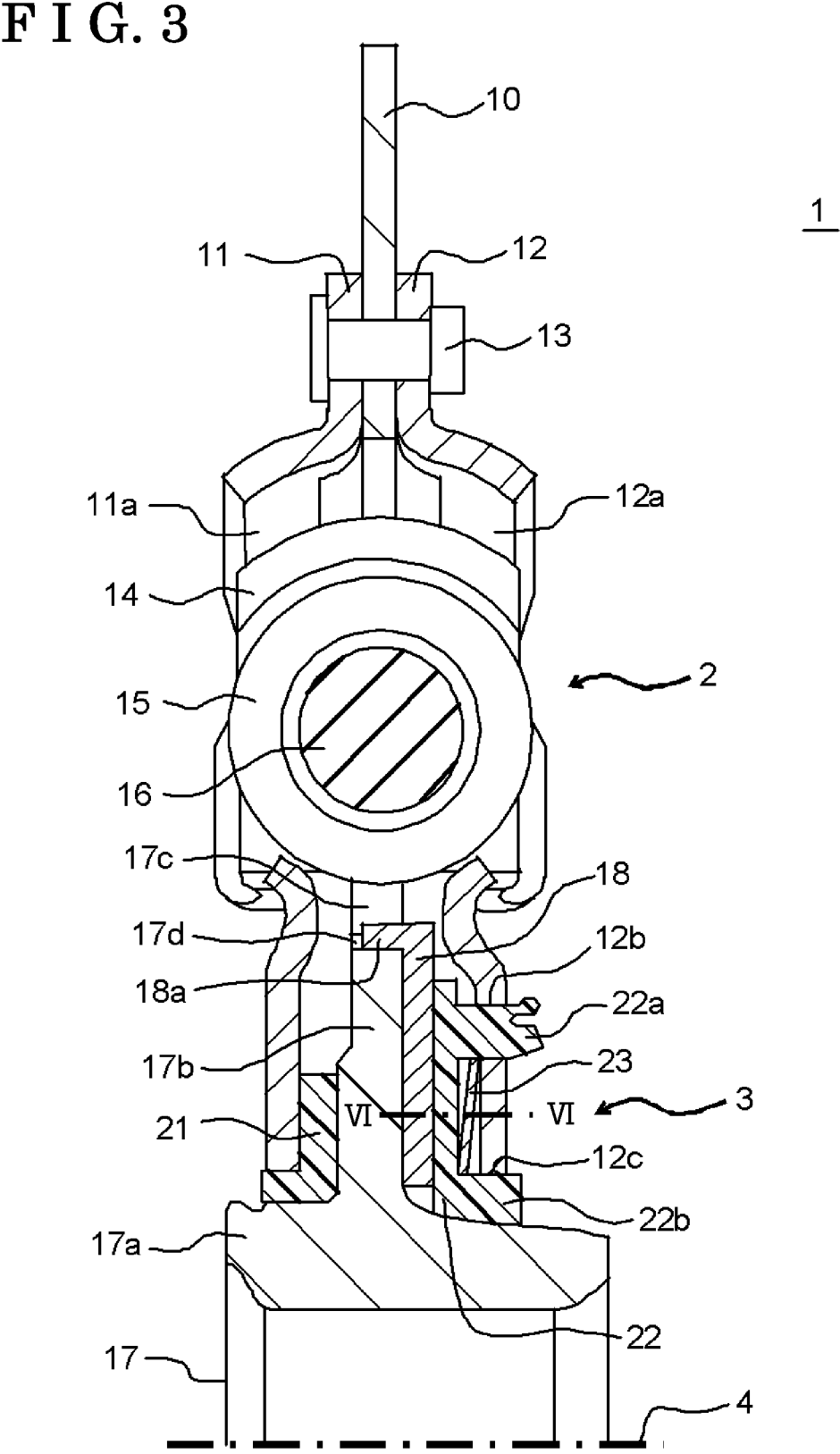
FIG. 3 is a partially enlarged cross-sectional view in FIG. 2 schematically illustrating the structure of the torque fluctuation absorber according to the first embodiment disclosed here.

The torque fluctuation absorber 1 of the first embodiment is arranged on a power transmission path between, for example, a rotary shaft of an engine as a driving source and a rotary shaft of a transmission, or alternatively a motor generator for a hybrid vehicle, a clutch drum of an automatic transmission or a pulley of a continuously variable transmission (CVT), to absorb (restrict) the torque fluctuations generated by the torsion between the rotary shafts (see FIGS. 1 to 3). The torque fluctuation absorber 1 serves as a component member of a clutch disc. The torque fluctuation absorber 1 has a function to absorb the torque fluctuations by including a damper portion 2 and a hysteresis portion 3. The damper portion 2 absorbs the torque fluctuations by an elastic force while the hysteresis portion 3 absorbs the torque fluctuations by means of the hysteresis torque generated by frictional force. The torque fluctuation absorber 1 may also include a limiter portion generating slippage when the torque fluctuations are beyond absorption capabilities of the damper portion 2 and the hysteresis portion 3.

The damper portion 2 is where a rotational driving force of the rotary shaft close to the engine is inputted. Then, the damper portion 2 outputs the rotational driving force inputted to, for example, a rotary shaft of the motor generator or an input shaft of the transmission. On a circumference of the damper portion 2, plural coil springs 15 are arranged.

The hysteresis portion 3 is positioned in parallel with the damper portion 2 on the power transmission path. The hysteresis portion 3 is arranged on a circumference radially inward of the damper portion 2 so as to be formed in an annular shape. The hysteresis portion 3 is configured to change, or vary the hysteresis value in accordance with a torsion direction and a torsion angle.

The torque fluctuation absorber 1 includes a plate 10, a first side plate 11, the second side plate 12, a rivet 13, a seat member 14, the coil spring 15, a cushion member 16, the hub member 17, the control plate 18, a first thrust member 21, the second thrust member 22 and the disc spring 23 (see FIGS. 1 to 5).

The plate 10 is an annular plate member (see FIGS. 1 to 3). The plate 10 may be used, for example, to be sandwiched between friction members of a clutch device, or to be fixed to a flywheel connected to the rotary shaft of the engine by means of a bolt. The plate 10 includes plural projections 10a protruding circumferentially inwardly from an inner circumferential end surface of the plate 10. The projections 10a are arranged to be sandwiched by the first and second side plates 11, 12, and connected and fixed to the first and second side plates 11, 12 by the rivets 13. Thus, the plate 10 integrally rotates with the first and second side plates 11, 12. The projections 10a also serve as component members of a stopper portion restricting an excessive torsion at the damper portion 2 (an excessive torsion between the hub member 17 and the first and second side plates 11, 12). Circumferentially opposite end surfaces of the projections 10a selectively make contact with and separate from projections 17e of the hub member 17, respectively, when the torsion is generated at the damper portion 2.

The first side plate 11 is a rotating member formed in an annular plate-shape and a component member of the damper portion 2 and the hysteresis portion 3 (see FIGS. 1 to 3). The first side plate 11 transmits the rotational driving force from the plate 10 to the damper portion 2 and the hysteresis portion 3. The first side plate 11 is arranged so as to separate from the second side plate 12. An outer circumferential portion of the first side plate 11 is connected, together with the projections 10a of the plate 10, to the second side plate 12 by the rivets 13. The first side plate 11 integrally rotates with the plate 10 and the second side plate 12. The first side plate 11 includes an opening portion 11a formed at an intermediate portion of the damper portion 2 to house the seat member 14, for example, a pair of the seat members 14 and the coil spring 15. Circumferentially opposite end surfaces of the opening portion 11a selectively make contact with and separate from the seat members 14, respectively. In a case where the torsion is not generated between the hub member 17 and the first and second side plates 11, 12, the opening portion 11a either makes contact with the seat members 14 arranged at opposite ends of the coil spring 15, or is positioned close to the seat members 14 while allowing play between the opening portion 11a and the seat members 14. In a case where the torsion is generated between the hub member 17 and the first and second side plates 11, 12, the opening portion 11a makes contact with one of the seat members 14. The first side plate 11 engages with the first thrust member 21 non-rotatably at the hysteresis portion 3 provided radially inward of the damper portion 2. The first side plate 11 is rotatably supported by the hub member 17 at an inner circumferential end portion of the first side plate 11 via the first thrust member 21.

The second side plate 12 is a rotating member formed in an annular plate-shape and a component member of the damper portion 2 and the hysteresis portion 3 (see FIGS. 1 to 3). The second side plate 12 transmits the rotational driving force from the plate 10 to the damper portion 2 and the hysteresis portion 3. The second side plate 12 is arranged so as to separate from the first side plate 11. An outer circumferential portion of the second side plate 12 is connected, together with the projections 10a of the plate 10, to the first side plate 11 by the rivets 13. The second side plate 12 integrally rotates with the plate 10 and the first side plate 11. The second side plate 12 includes an opening portion 12a formed at the intermediate portion of the damper portion 2 to house the seat members 14 and the coil spring 15. Circumferentially opposite end surfaces of the opening portion 12a selectively make contact with and separate from the seat members 14, respectively. In a case where the torsion is not generated between the hub member 17 and the first and second side plates 11, 12, the opening portion 12a either makes contact with the seat members 14 arranged at the opposite ends of the coil spring 15, or is positioned close to the seat members 14 while allowing play between the opening portion 12a and the seat members 14. In a case where the torsion is generated between the hub member 17 and the first and second side plates 11, 12, the opening portion 11a makes contact with one of the seat members 14. The second side plate 12 includes plural hole portions 12b and recessed portions 12c to engage with the second thrust member 22 to be axially movable and non-rotatable at the hysteresis portion 3 radially inward of the damper portion 2. The hole portions 12b engage with first rotation prevention portions 22a of the second thrust member 22 to be axially movable. The first rotation prevention portions 22a is formed in a protruding shape. Recessed portions 12c engage with second rotation prevention portions 22b of the second thrust member 22 to be axially movable. The second rotation prevention portion 22b is also formed in a protruding shape. The second side plate 12 supports the outer circumferential end portion of the disc spring 23 at the portion between the opening portion 12a and the hole portions 12b of the hysteresis portion 3. The second side plate 12 is rotatably supported by the hub member 17 at an inner circumferential end portion of the second side plate 12 via the second thrust member 22.

The rivet 13 is a member to connect the plate 10 to the first and second side plates 11, 12 (see FIGS. 1 to 3).

Each of the seat members 14 is a component member of the damper portion 2 (see FIGS. 1 to 3). The seat members 14 are housed within opening portions 11a, 12a and 17c formed at the first and second side plates 11, 12 and a flange portion 17b of the hub member 17, respectively. The seat members 14 are arranged between circumferentially opposite end surfaces of the opening portions 11a, 12a and 17c and the opposite ends of the coil spring 15. In order to reduce a friction of the coil spring 15, the seat members 14 may be made of resin.

The coil spring 15 is a component member of the damper portion 2 (see FIGS. 1 to 3). The coil spring 15 is housed within the opening portions 11a, 12a and 17c formed at the first and second side plates 11, 12 and the flange portion 17b of the hub member 17, respectively, and makes contact with the seat members 14 arranged at the opposite ends of the coil spring 15. The coil spring 15 is compressed when the torsion is generated between the first and second side plates 11, 12 and the hub member 17, and absorbs a shock caused by a rotational difference between the first and second side plates 11, 12 and the hub member 17. The cushion member 16 is arranged at an inside of the coil of the predetermined coil spring 15.

The cushion member 16 is a member to absorb a shock generated when the projections 17e of the hub member 17 make contact with the projections 10a of the plate 10 in a case where the torsion is generated at the damper portion 2 (see FIGS. 1 to 3). The cushion member 16 is arranged at the inside of the wire of the coil spring 15. When the torsion is generated at the damper portion 2, the cushion member 16 remains in an unloaded condition until the cushion member 16 is pressed by the pair of the seat members 14. The cushion member 16 is pressed by the pair of the seat members 14 before the projections 17e of the hub member 17 make contact with the projections 10a of the plate 10.

The hub member 17 is a rotating member which includes a flange portion 17b extending radially outward from a predetermined portion of an outer circumferential surface of a hub portion 17a formed in a cylindrical shape. The hub member 17 is a component member of the damper portion 2 and the hysteresis portion 3 (see FIGS. 1 to 3). The hub member 17 rotates about a rotary shaft 4. The hub member 17 is coaxially arranged with the first and second side plates 11, 12. The hub member 17 outputs the rotational driving force which is transmitted from the damper portion 2 and the hysteresis portion 3. The hub portion 17a forms an inner spline at an inner circumferential surface of the hub portion 17a for connecting to (engaging with) the rotary shaft of the transmission (an outer spline of the rotary shaft 4). The hub portion 17a rotatably supports the first side plate 11 via the first thrust member 21. The hub portion 17a rotatably supports the second side plate 12 via the second thrust member 22. The flange portion 17b includes the plural projections 17e protruding circumferentially outwardly from an outer circumferential end surface. The projection 17e is a component member of the stopper portion for restricting the excessive torsion at the damper portion 2 (the excessive torsion between the hub member 17 and the first and second side plates 11, 12). Circumferentially opposite end surfaces of the projections 17e selectively make contact with and separate from the projections 10a of the plate 10, respectively. The flange portion 17b includes the opening portion 17c housing the seat members 14 and the coil spring 15 at the damper portion 2. Circumferentially opposite end surfaces of the opening portion 17c selectively make contact with and separate from the seat members 14, respectively. In a case where the torsion is not generated between the hub member 17 and the first and second side plates 11, 12, the opening portion 17c makes contacts with the seat members 14 arranged at the opposite ends of the coil spring 15, or is positioned close to the seat members 14 while allowing play between the opening portion 17c and the seat members 14. In a case where the torsion is generated between the hub member 17 and the first and second side plates 11, 12, the opening portion 17c makes contact with one of the seat members 14. At the hysteresis portion 3 radially inward from the damper portion 2, a surface of the flange portion 17b slides, that is, is slidably pressed against the first thrust member 21 in the axial direction. The flange portion 17b includes plural recessed portions 17d (through holes may also apply) at a portion radially inward of the opening portion 17c. The recessed portion 17d is a recession cut out from a radially inner surface of the opening portion 17c radially inward of the opening portion 17c and attached to a protruding portion 18a of the control plate 18. By attaching the recessed portion 17d to the protruding portion 18a, the hub member 17 is engaged with the control plate 18 so as to be non-rotatable (or may be fixed) relative to the control plate 18. At the hysteresis portion 3, a surface of the flange portion 17b is pressed against the control plate 18 in the axial direction.

The control plate 18 is a press member produced by pressing an annular board member. The control plate 18 is a component member of the hysteresis portion 3 (see FIGS. 1 to 4). The control plate 18 is arranged between the flange portion 17b and the second thrust member 22 in an axial direction. At the hysteresis portion 3, the control plate 18 slidably presses against (engages with) the second thrust member 22 to change, or vary the hysteresis value in accordance with the torsion direction and the torsion angle. A surface of the control plate 18 close to the flange portion 17b in the axial direction makes contact with the flange portion 17b. The surface of the flange portion 17b is a back surface of a flat surface portion 18b and is non-slidable. The control plate 18 includes the protruding portions 18a which are attached to the recessed portions 17d at a predetermined portion of an outer circumferential portion (an outer circumferential portion of the flat surface portion 18b). By attaching the protruding portion 18a to the recessed portion 17d, the hub member 17 and the control plate 18 are engaged in a relatively non-rotatable manner (or a relatively non-rotatable and axially unmovable manner, or may be fixed). The control plate 18 has an asymmetrical shape relative to an annular (sliding) surface of the second thrust member 22 to correspond to the torsion direction and the torsion angle between the second thrust member 22 and the control plate 18. The control plate 18 is also formed in a configuration in which an inclined angle of the sliding surface is changed in a circumferential direction. As shown in FIG. 4, for example, the flat surface portion 18b and inclined surface portions 18c, 18d are arranged in this order repeatedly in the circumferential direction. The flat surface portion 18b includes a flat surface orthogonal to the axial direction. A length of the flat surface portion 18b in the circumferential direction is longer than a length of a flat surface portion of the second thrust member 22 (the flat surface portion 22e in FIG. 5) in the circumferential direction. A surface of the flat surface portion 18b close to the second thrust member 22 in the axial direction selectively slidably makes contact with and separates from the flat surface portion of the second thrust member 22 (the flat surface portion 22e in FIG. 5). The inclined surface portion 18c includes a surface inclined to be away from the flange portion 17b further as the inclined surface portion 18c is distanced from the flat surface portion 18b adjacent to the inclined surface portion 18c in the circumferential direction. The inclined surface portion 18c corresponds to an inclined angle of an inclined surface portion of the second thrust member 22 (an inclined surface portion 22d in FIG. 5) and slidably makes contact with (engages with) or separates from the inclined surface portion (the inclined surface portion 22d in FIG. 5). The inclined surface portion 18d includes a surface inclined to be closer to the flange portion 17b as the inclined surface portion 18d is close to the flat surface portion 18b adjacent to the inclined surface portion 18d in the circumferential direction. The inclined surface portion 18d is set not to make contact with an inclined surface portion of the second thrust member 22 (the inclined surface portion 22f in FIG. 5) by stopper portions (the projections 10a and 17e) which restrict the torsion of the damper portion 2 and the hysteresis portion 3. A length of the inclined surface portion 18d in the circumferential direction is shorter than a length of an inclined surface portion 18c in the circumferential direction. The control plate 18 may be made from, for example, friction member, resin, metal or surface-processing metal in order to stabilize a hysteresis when the control plate 18 and the second thrust member 22 slide one another. Alternately, the control plate 18 may be formed integrally with the hub member 17. The control plate 18 may be produced by pressing a metal plate.

The first thrust member 21 is an annular member and a component member of the hysteresis portion 3 (see FIGS. 1 to 3). The first thrust member 21 is arranged between the first side plate 11 and the flange portion 17b of the hub member 17 in an axial direction. The first thrust member 21 non-rotatably engages with the first side plate 11. The first thrust member 21 slidably presses against the flange portion 17b. The first thrust member 21 is also arranged between the first side plate 11 and the hub portion 17a in a radial direction to serve as a sliding bearing (a bush) supporting the first side plate 11 so that the first side plate 11 rotates relative to the hub portion 17a. The first thrust member 21 may be made from, for example, friction member, resin, metal or surface-processing metal in order to stabilize the hysteresis when the first thrust member 21 and the flange portion 17b slide one another.

Figure 5A:
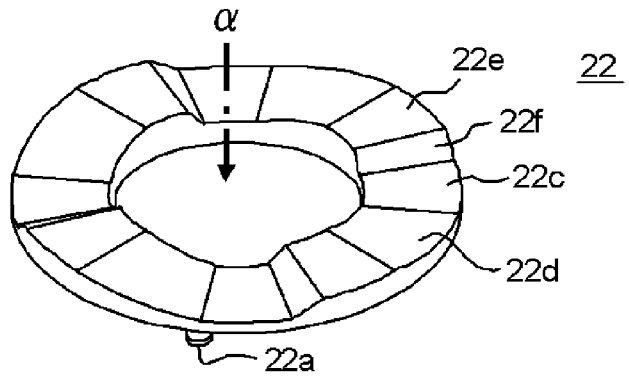
FIG. 5A is a perspective view schematically illustrating a structure of a second thrust member of the torque fluctuation absorber according to the first embodiment disclosed here.
Figure 5B:
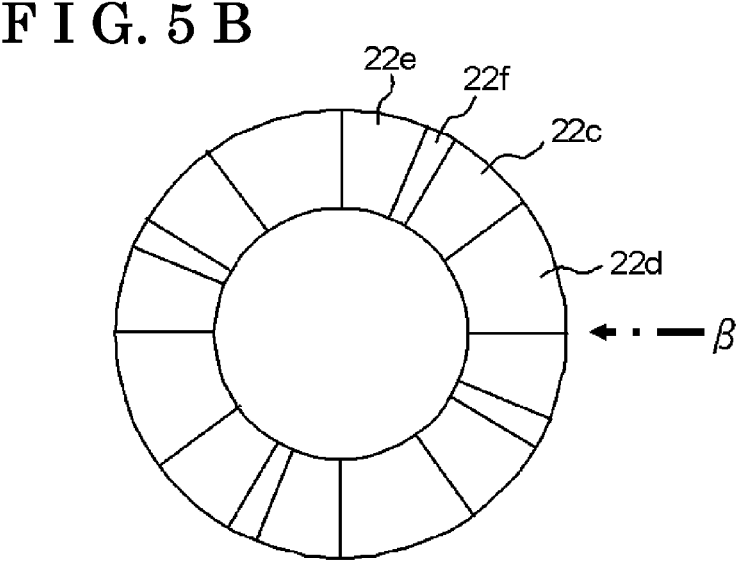
FIG. 5B is a plan view seen from a direction of an arrow in FIG. 5A schematically illustrating the structure of the second thrust member of the torque fluctuation absorber according to the first embodiment.
Figure 5C:
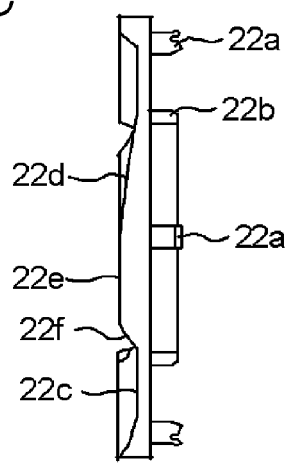
FIG. 5C is a side view seen from a direction of an arrow in FIG. 5B schematically illustrating the structure of the second thrust member of the torque fluctuation absorber according to the first embodiment.

The second thrust member 22 is an annular member and a component member of the hysteresis portion 3 (see FIGS. 1 to 3 and 5). The second thrust member 22 is arranged between the second side plate 12 and the control plate 18 in the axial direction. The second thrust member 22 slidably presses against (engages with) the control plate 18 to change, or vary the hysteresis value in accordance with the torsion direction and the torsion angle at the hysteresis portion 3. The second thrust member 22 is axially displaced in accordance with the torsion direction and the torsion angle relative to the control plate 18 at the hysteresis portion 3, and accordingly, an amount of compression of the disc spring 23 arranged between the second thrust member 22 and the second side plate 12 in the axial direction is changed. Thus, a pressure load of the disc spring 23 increases and decreases resulting in that the hysteresis value at the hysteresis portion 3 changes. The second thrust member 22 includes the plural first and second rotation prevention portions 22a, 22b to engage with the second side plate 12 to be axially movable and non-rotatable. The first rotation prevention portions 22a are protrudingly formed and engage with the hole portions 12b of the second side plate 12 movably in the axial direction. The first rotation prevention portions 22a engage with the disc spring 23 to be axially movable and non-rotatable. The second rotation prevention portions 22b are protrudingly formed and engage with the recessed portions 12c of the second side plate 12 to be axially movable. A (non-sliding) surface of the second thrust member 22 close to the second side plate 12 is biased by the disc spring 23. The second thrust member 22 is formed in a configuration in which the inclined angle of the (sliding) surface of the second thrust member 22 close to the control plate 18 is changed in the circumferential direction. As shown in FIG. 5, for example, a flat surface portion 22c, an inclined surface portion 22d, a flat surface portion 22e and an inclined surface portion 22f are formed repeatedly in this order in the circumferential direction. The flat surface portion 22c includes a flat surface orthogonal to the axial direction. The inclined surface portion 22d includes a surface inclined to be closer to the flange portion 17b as the inclined surface portion 22d is distanced from the flat surface portion 22c adjacent to the inclined surface portion 22d in the circumferential direction. The inclined surface portion 22d corresponds to an inclined angle of an inclined surface portion of the control plate 18 (an inclined surface portion 18c in FIG. 4) and slidably makes contact with (engages with) or separates from the inclined surface portion (the inclined surface portion 18c in FIG. 4). The flat surface portion 22e includes a flat surface orthogonal to the axial direction. The flat surface portion 22e is arranged closer to the control plate 18 than the flat surface portion 22c in the axial direction. A length of the flat surface portion 22e in the circumferential direction is shorter than a length of the flat surface portion of the control plate 18 in the circumferential direction (the flat surface portion 18b in FIG. 4). The flat surface portion 22e slidably makes contact with and separates from the flat surface portion (the flat surface portion 18b in FIG. 4). The inclined surface portion 22f includes a surface inclined to be away from the flange portion 17b further as the inclined surface portion 22f is close to the flat surface portion 22c adjacent to the inclined surface portion 22f in the circumferential direction. The inclined surface portion 22f is set not to make contact with the inclined surface portion of the control plate 18 (the inclined surface portion 18d in FIG. 4) by the stopper portions (the projections 10a and 17e) which restrict the torsion of the damper portion 2 and the hysteresis portion 3. A length of the inclined surface portion 22f in the circumferential direction is shorter than a length of an inclined surface portion 22d. The second thrust member 22 may be made from, for example, friction member, resin, metal or surface-processing metal in order to stabilize the hysteresis when the second thrust member 22 and the control plate 18 slide one another.

The disc spring 23 is a component member of the hysteresis portion 3. The disc spring 23 is a disc-shaped elastic member arranged between the second thrust member 22 and the second side plate 12 and biases the second thrust member 22 toward the flange portion 17b of the hub member 17 (see FIGS. 1 to 3).

Next, an operation of the torque fluctuation absorber 1 according to the first embodiment is described with reference to FIGS. 6 and 7.

Figure 6A:
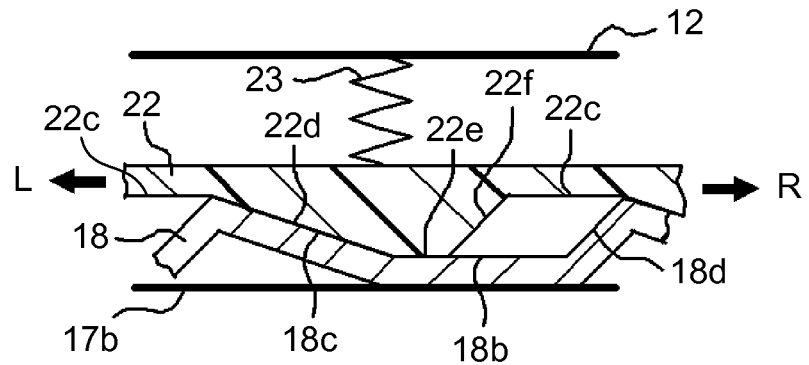
FIG. 6A is a cross-sectional view when a torsion is not generated taken along the line VI-VI in a circumferential direction in FIG. 3 schematically illustrating an operation of a hysteresis portion of the torque fluctuation absorber according to the first embodiment.
Figure 7:
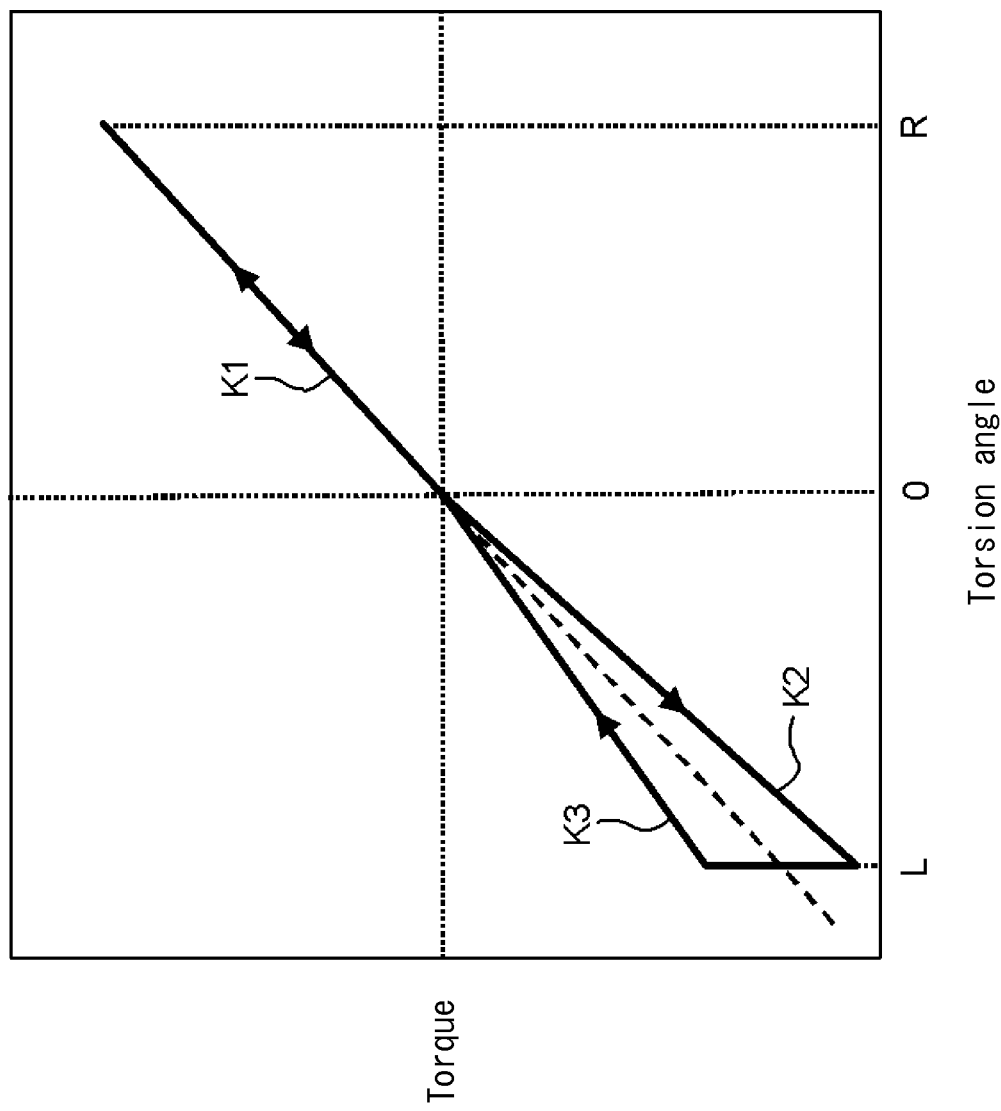
FIG. 7 is a view schematically illustrating a torsion characteristic of the torque fluctuation absorber according to the first embodiment.

As illustrated in FIG. 6A, in a case where the torsion is not generated at the hysteresis portion 3 (the torsion between the second side plate 12 and the flange portion 17b) in FIG. 1, the second thrust member 22 is pressed by the disc spring 23 to make contact with the control plate 18. Accordingly, the flat surface portion 18b of the control plate 18 and the flat surface portion 22e of the second thrust member 22 make contact with one another while the inclined surface portion 18c of the control plate 18 and the inclined surface portion 22d of the second thrust member 22 make contact with one another.

Figure 6B:
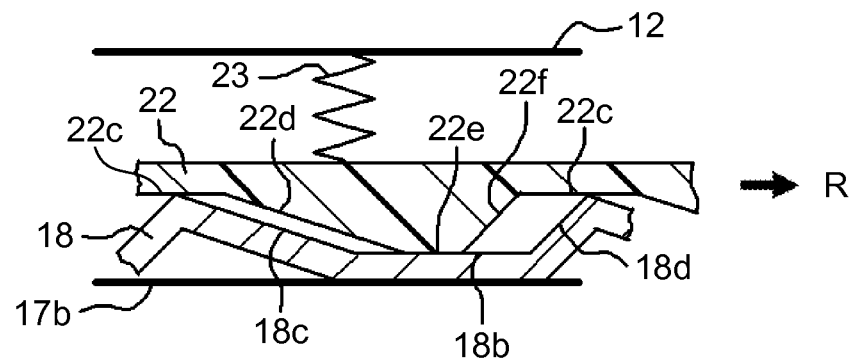
FIG. 6B is a cross-sectional view when the second thrust member is twisted in an R direction in FIG. 6A.

In a case where the torsion is generated at the hysteresis portion 3 in FIG. 1 from a positioning of the control plate 18 and the second thrust member 22 shown in FIG. 6A and the second side plate 12 slides in an R direction relative to the flange portion 17b, the second thrust member 22 (non-rotatable relative to the second side plate 12) slides in the R direction relative to the control plate 18 (non-rotatable relative to the flange portion 17b) as shown in FIG. 6B. That is, the flat surface portion 18b of the control plate 18 and the flat surface portion 22e of the second thrust member 22 slide one another while the inclined surface portion 18c of the control plate 18 and the inclined surface portion 22d of the second thrust member 22 are separated. When the flat surface portion 18b and the flat surface portion 22e slide one another while the inclined surface portions 18c, 22d are separated one another as shown in FIG. 6B, the second thrust member 22 is not axially displaced toward the second side plate 12 relative to the control plate 18, and accordingly, a pressing force of the second thrust member 22 by the disc spring 23 does not change and the hysteresis value does not change, or vary. In a case where the second thrust member 22 slides in the R direction relative to the control plate 18, the inclined surface portion 18d of the control plate 18 and the inclined surface portion 22f of the second thrust member 22 do not make contact with one another because the stopper portions (the projections 10a and 17e in FIG. 2) restrict the excessive torsion. When the positioning of the control plate 18 and the second thrust member 22 shown in FIG. 6A changes to a positioning of the control plate 18 and the second thrust member 22 shown in FIG. 6B, a change in a torsion characteristic of the torque fluctuation absorber 1 is indicated with line K1 in FIG. 7. When the positioning of the control plate 18 and the second thrust member 22 shown in FIG. 6B changes to the positioning of the control plate 18 and the second thrust member 22 shown in FIG. 6A, a change in a torsion characteristic of the torque fluctuation absorber 1 is also indicated with line K1 in FIG. 7.

Figure 6C:
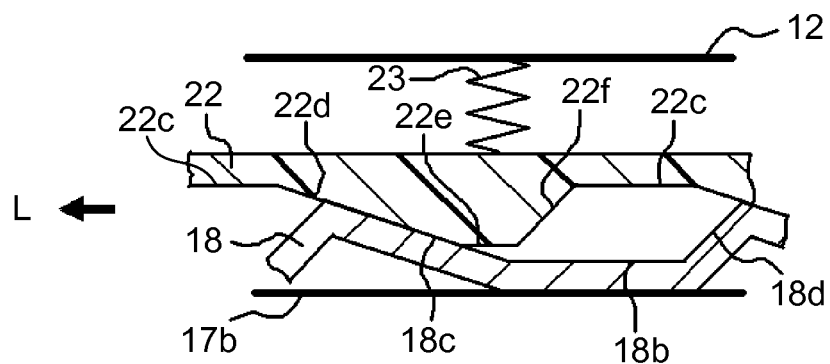
FIG. 6C is a cross-sectional view when the second thrust member is twisted in an L direction in FIG. 6B.

In a case where the torsion is generated at the hysteresis portion 3 in FIG. 1 from the positioning of the control plate 18 and the second thrust member 22 shown in FIG. 6A and the second side plate 12 twists in an L direction relative to the flange portion 17b, the second thrust member 22 (non-rotatable relative to the second side plate 12) twists in the L direction relative to the control plate 18 (non-rotatable relative to the flange portion 17b) as shown in FIG. 6c. That is, the inclined surface portion 18c of the control plate 18 and the inclined surface portion 22d of the second thrust member 22 slide one another, that is, the inclined surface portion 22d slides onto the inclined surface portion 18c, and the flat surface portion 18b of the control plate 18 and the flat surface portion 22e of the second thrust member 22 are separated. When the inclined surface portion 18c and the inclined surface portion 22d slide one another while the flat surface portions 18b, 22e are separated one another as shown in FIG. 6C, the second thrust member 22 is axially displaced toward the second side plate 12 relative to the control plate 18, and accordingly, the disc spring 23 arranged between the second thrust member 22 and the second side plate 12 in the axial direction is contracted. Thus, a pressure force of the second thrust member 22 by the disc spring 23 increases resulting in that the hysteresis value increases. In a case where the second thrust member 22 twists in the L direction relative to the control plate 18, the inclined surface portion 18c of the control plate 18 and the inclined surface portion 22d of the second thrust member 22 are restricted to make contact with one another because the stopper portions (the projections 10a and 17e) restrict the excessive torsion. When the positioning of the control plate 18 and the second thrust member 22 shown in FIG. 6A changes to a positioning of the control plate 18 and the second thrust member 22 shown in FIG. 6C, a change in a torsion characteristic of the torque fluctuation absorber 1 is indicated with line K2 in FIG. 7. When the positioning of the control plate 18 and the second thrust member 22 shown in FIG. 6c changes to the positioning of the control plate 18 and the second thrust member 22 shown in FIG. 6A, a change in a torsion characteristic of the torque fluctuation absorber 1 is indicated with line K3 in FIG. 7. The second thrust member 22 is axially displaced toward the flange portion 17b relative to the control plate 18, and accordingly, a contraction rate of the disc spring 23 arranged between the second thrust member 22 and the second side plate 12 in the axial direction is decreased. Thus, the pressure force of the second thrust member 22 by the disc spring 23 decreases resulting in that the hysteresis torque at the hysteresis portion 3 decreases.

According to the first embodiment, as the torque fluctuation absorber 1 is configured to generate the change in the hysteresis value of the hysteresis portion 3 in accordance with the torsion direction and the torsion angle by changing forms of an each sliding surface of the control plate 18 and the second thrust member 22, the configurations of the torque fluctuation absorber 1 other than the control plate 18 and the second thrust member 22 are not required to be complicated, resulting in that a strength of the torque fluctuation absorber 1 may be maintained. According to the first embodiment, because the hysteresis value of the hysteresis portion 3 changes, or varies in accordance with the change in the forms of each the sliding surfaces of the control plate 18 and the second thrust member 22, a large frictional force may be generated. Further, according to the first embodiment, by controlling the inclined angles, that is, by including different inclined angles, of each of the sliding surfaces of the control plate 18 and the second thrust member 22, any hysteresis value may be set to correspond to the torsion direction and the torsion angle.

The torque fluctuation absorber 1 according to the second embodiment will be described with reference to FIGS. 8 to 10.

The second embodiment is a modified example of the first embodiment and is changed to include more steps on each of the sliding surfaces of the control plate 18 and the second thrust member 22. The configurations of the torque fluctuation absorber 1 other than the control plate 18 and the second thrust member 22 are the same as the configurations of the first embodiment.

An annular surface (sliding surface) of the control plate 18 close to the second thrust member 22 forms multiple steps (2 steps in the R direction and 3 steps in the L direction) in the circumferential direction. As illustrated in FIG. 8, for example, a flat surface portion 18p, an inclined surface portion 18q, a flat surface portion 18r, an inclined surface portion 18s, a flat surface portion 18t, an inclined surface portion 18u, a flat surface portion 18v and an inclined surface portion 18w are formed repeatedly in this order in the circumferential direction. Other configurations of the torque fluctuation absorber 1 are the same as the configurations of the control plate 18 of the first embodiment (see FIGS. 1 to 4).

The flat surface portion 18p includes a flat surface orthogonal to the axial direction. A length of the flat surface portion 18p in the circumferential direction is shorter than a length of a flat surface portion 22p of the second thrust member 22 in the circumferential direction. A surface of the flat surface portion 18p close to the second thrust member 22 in the axial direction selectively slidably makes contact with and separates from a flat surface portion 22p of the second thrust member 22.

The inclined surface portion 18q includes a surface inclined to be closer to the flange portion 17b as the inclined surface portion 18q is distanced from the flat surface portion 18p adjacent to the inclined surface portion 18q in the circumferential direction. The inclined surface portion 18q corresponds to an inclined angle of an inclined surface portion 22q of the second thrust member 22 and slidably makes contact with (engages with) or separates from the inclined surface portion 22q. For example, it is favorable that the inclined surface portion 18q has the same inclined angle as the inclined angle of the inclined surface portion 22q. The inclined surface portion 18q is set not to make contact with an inclined surface portion 22s of the second thrust member 22 by the stopper portions (the projections 10a and 17e) which restrict the torsion of the damper portion 2 and the hysteresis portion 3.

The flat surface portion 18r includes a flat surface orthogonal to the axial direction. The flat surface portion 18r is arranged between the inclined surface portions 18q and 18s in the circumferential direction. A length of the flat surface portion 18r in the circumferential direction is the same as a length of a flat surface portion 22r of the second thrust member 22 in the circumferential direction, and is longer than a flat surface portion 22t of the second thrust member 22 in the circumferential direction. A surface of the flat surface portion 18r close to the second thrust member 22 selectively slidably makes contact with and separates from either the flat surface portion 22r or the flat surface portion 22t of the second thrust member 22.

The inclined surface portion 18s includes a surface inclined to be closer to the flange portion 17b as the inclined surface portion 18s is distanced from the flat surface portion 18r adjacent to the inclined surface portion 18s in the circumferential direction. The inclined surface portion 18s corresponds to an inclined angle of an inclined surface portion 22s of the second thrust member 22 and slidably makes contact with (engages with) or separates from the inclined surface portion 22s. For example, it is favorable that the inclined surface portion 18s has the same inclined angle as the inclined angle of the inclined surface portion 22s. The inclined angle of the inclined surface portion 18s is the same as the inclined angle of the inclined surface portion 18q.

The flat surface portion 18t includes a flat surface orthogonal to the axial direction. The flat surface portion 18t is arranged between the inclined surface portions 18s, 18u in the circumferential direction. A length of the flat surface portion 18t in the circumferential direction is longer than a length of a flat surface portion 22t of the second thrust member 22 in the circumferential direction. A surface of the flat surface portion 18t close to the second thrust member 22 selectively slidably makes contact with and separates from the flat surface portion 22t of the second thrust member 22.

The inclined surface portion 18u includes a surface inclined to be away from the flange portion 17b further as the inclined surface portion 18u is distanced from the flat surface portion 18t adjacent to the inclined surface portion 18u in the circumferential direction. The inclined surface portion 18u corresponds to an inclined angle of an inclined surface portion 22u of the second thrust member 22, and slidably makes contact with (engages with) or separates from the inclined surface portion 22u.

The flat surface portion 18v includes a flat surface orthogonal to the axial direction. The flat surface portion 18v is arranged between the inclined surface portions 18u and 18w in the circumferential direction. A length of the flat surface portion 18v in the circumferential direction is the same as a length of a flat surface portion 22v of the second thrust member 22 in the circumferential direction. A surface of the flat surface portion 18v close to the second thrust member 22 in the axial direction selectively slidably makes contact with and separates from the flat surface portion 22v or the flat surface portion 22t of the second thrust member 22.

The inclined surface portion 18w includes a surface inclined to be away from the flange portion 17b further as the inclined surface portion 18w is distanced from the flat surface portion 18v adjacent to the inclined surface portion 18w in the circumferential direction. The inclined surface portion 18w corresponds to an inclined angle of an inclined surface portion 22w of the second thrust member 22 and slidably makes contact with (engages with) or separates from the inclined surface portion 22w. For example, it is favorable that the inclined surface portion 18w has the same inclined angle as the inclined angle of the inclined surface portion 22w. The inclined angle of the inclined surface portion 18w is the same as an inclined angle of the inclined surface portion 18u and may be either the same or different from an absolute value of the inclined angle of the inclined surface portions 18q and 18s. The inclined surface portion 18w is set not to make contact with the inclined surface portion 22u of the second thrust member 22 by the stopper portions (the projections 10a and 17e) which restrict the torsion of the damper portion 2 and the hysteresis portion 3.

The second thrust member 22 is formed in a configuration in which the inclined angle of the (sliding) surface of the second thrust member 22 close to the control plate 18 is changed in the circumferential direction. As shown in FIG. 8, for example, the flat surface portion 22p, the inclined surface portion 22q, the flat surface portion 22r, the inclined surface portion 22s, the flat surface portion 22t, the inclined surface portion 22u, the flat surface portion 22v and the inclined surface portion 22w are formed repeatedly in this order in the circumferential direction. Other configurations of the second thrust member 22 are the same as the configurations of the second thrust member 22 of the first embodiment (FIGS. 1 to 3 and 5).

The flat surface portion 22p includes a flat surface orthogonal to the axial direction. A length of the flat surface portion 22p in the circumferential direction is longer than a length of the flat surface portion 18p of the control plate 18 in the circumferential direction. The flat surface portion 22p selectively slidably makes contact with and separates from the flat surface portion 18p.

The inclined surface portion 22q includes a surface inclined to be closer to the flange portion 17b as the inclined surface portion 22q is distanced from the flat surface portion 22p adjacent to the inclined surface portion 22q in the circumferential direction. The inclined surface portion 22q corresponds to the inclined angle of an inclined surface portion 18q of the control plate 18 and slidably makes contact with (engages with) or separates from the inclined surface portion 18q.

The flat surface portion 22r includes a flat surface orthogonal to the axial direction. The flat surface portion 22r is arranged between the inclined surface portions 22q and 22s in the circumferential direction. A length of the flat surface portion 22r in the circumferential direction is the same as a length of the flat surface portion 18r of the control plate 18 in the circumferential direction, and is shorter than a length of the flat surface portion 18p of the control plate 18 in the circumferential direction. The flat surface portion 22r selectively slidably makes contact with and separates from either the flat surface portion 18r or the flat surface portion 18p of the control plate 18.

The inclined surface portion 22s includes a surface inclined to be closer to the flange portion 17b as the inclined surface portion 22s is distanced from the flat surface portion 22r adjacent to the inclined surface portion 22s in the circumferential direction. The inclined surface portion 22s corresponds to the inclined angle of an inclined surface portion 18s of the control plate 18 and slidably makes contact with (engages with) or separates from the inclined surface portion 18s. For example, it is favorable that the inclined surface portion 22s has the same inclined angle as the inclined angle of the inclined surface portion 18s. The inclined angle of the inclined surface portion 22s is the same as the inclined angle of the inclined surface portion 22q. The inclined surface portion 22s is set not to make contact with an inclined surface portion 18q of the control plate 18 by the stopper portions (the projections 10a and 17e) which restrict the torsion of the damper portion 2 and the hysteresis portion 3.

The flat surface portion 22t includes a flat surface orthogonal to the axial direction. The flat surface portion 22t is arranged between the inclined surface portions 22s and 22u in the circumferential direction. A length of the flat surface portion 22*t* in the circumferential direction is shorter than a length of the flat surface portion 18*t* of the control plate 18 in the circumferential direction. The flat surface portion 22*t* selectively slidably makes contact with and separates from the flat surface portion 18*t* of the control plate 18.

The inclined surface portion 22*u* includes a surface inclined to be away from the flange portion 17*b* further as the inclined surface portion 22*u* is distanced from the flat surface portion 22*t* adjacent to the inclined surface portion 22*u* in the circumferential direction. The inclined surface portion 22*u* corresponds to the inclined angle of an inclined surface portion 18*u* of the control plate 18 and slidably makes contact with (engages with) or separates from the inclined surface portion 18*u*. For example, it is favorable that the inclined surface portion 22*u* has the same inclined angle as the inclined angle of the inclined surface portion 18*u*. The inclined surface portion 22*u* is set not to make contact with the inclined surface portion 18*w* of the control plate 18 by the stopper portions (the projections 10*a* and 17*e*) which restrict the torsion of the damper portion 2 and the hysteresis portion 3.

The flat surface portion 22*v* includes a flat surface orthogonal to the axial direction. The flat surface portion 22*v* is arranged between the inclined surface portions 22*u* and 22*w* in the circumferential direction. A length of the flat surface portion 22*v* in the circumferential direction is the same as a length of the flat surface portion 18*v* of the control plate 18 in the circumferential direction. The flat surface portion 22*v* selectively slidably makes contact with and separates from either the flat surface portion 18*v* or the flat surface portion 18*p* of the control plate 18.

The inclined surface portion 22*w* includes a surface inclined to be away from the flange portion 17*b* further as the inclined surface portion 22*w* is distanced from the flat surface portion 22*v* adjacent to the inclined surface portion 22*w* in the circumferential direction. The inclined surface portion 22*w* corresponds to the inclined angle of an inclined surface portion 18*w* of the control plate 18 and slidably makes contact with (engages with) or separates from the inclined surface portion 18*w*. For example, it is favorable that the inclined surface portion 22*w* has the same inclined angle as the inclined angle of the inclined surface portion 18*w*. The inclined angle of the inclined surface portion 22*w* is the same as the inclined angle of the inclined surface portion 22*u* and may be either the same or different from an absolute value of the inclined angles of the inclined surface portions 22*q* and 22*s*. If different, the hysteresis relative to a rotary direction may be asymmetric.

An operation of the torque fluctuation absorber 1 according to the second embodiment is described as follows.

Figure 8A:
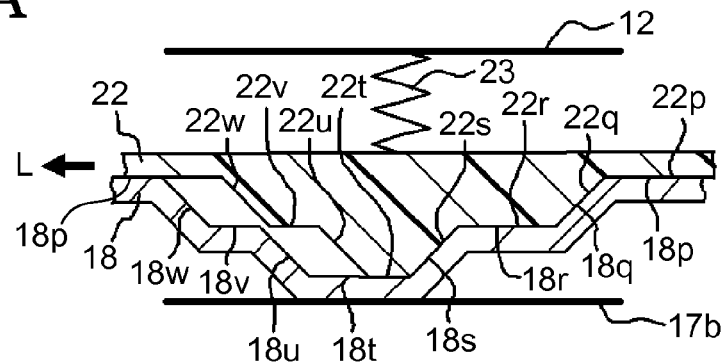
FIG. 8A is a cross-sectional view schematically illustrating an operation of a hysteresis portion of the torque fluctuation absorber according to the second embodiment.
Figure 9A:
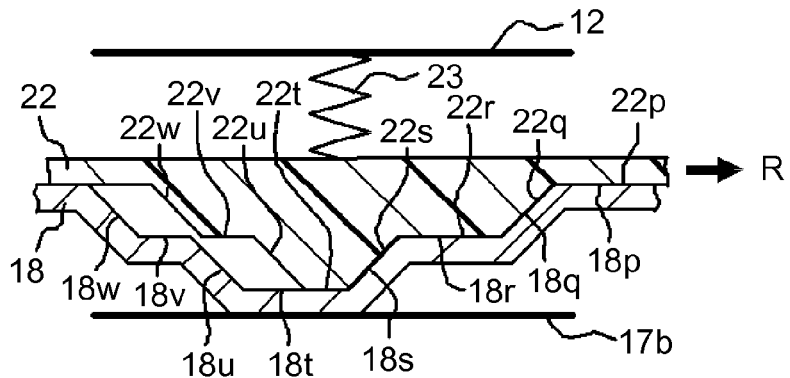
FIG. 9A is a cross-sectional view schematically illustrating an operation of the hysteresis portion of the torque fluctuation absorber according to the second embodiment.
Figure 10:
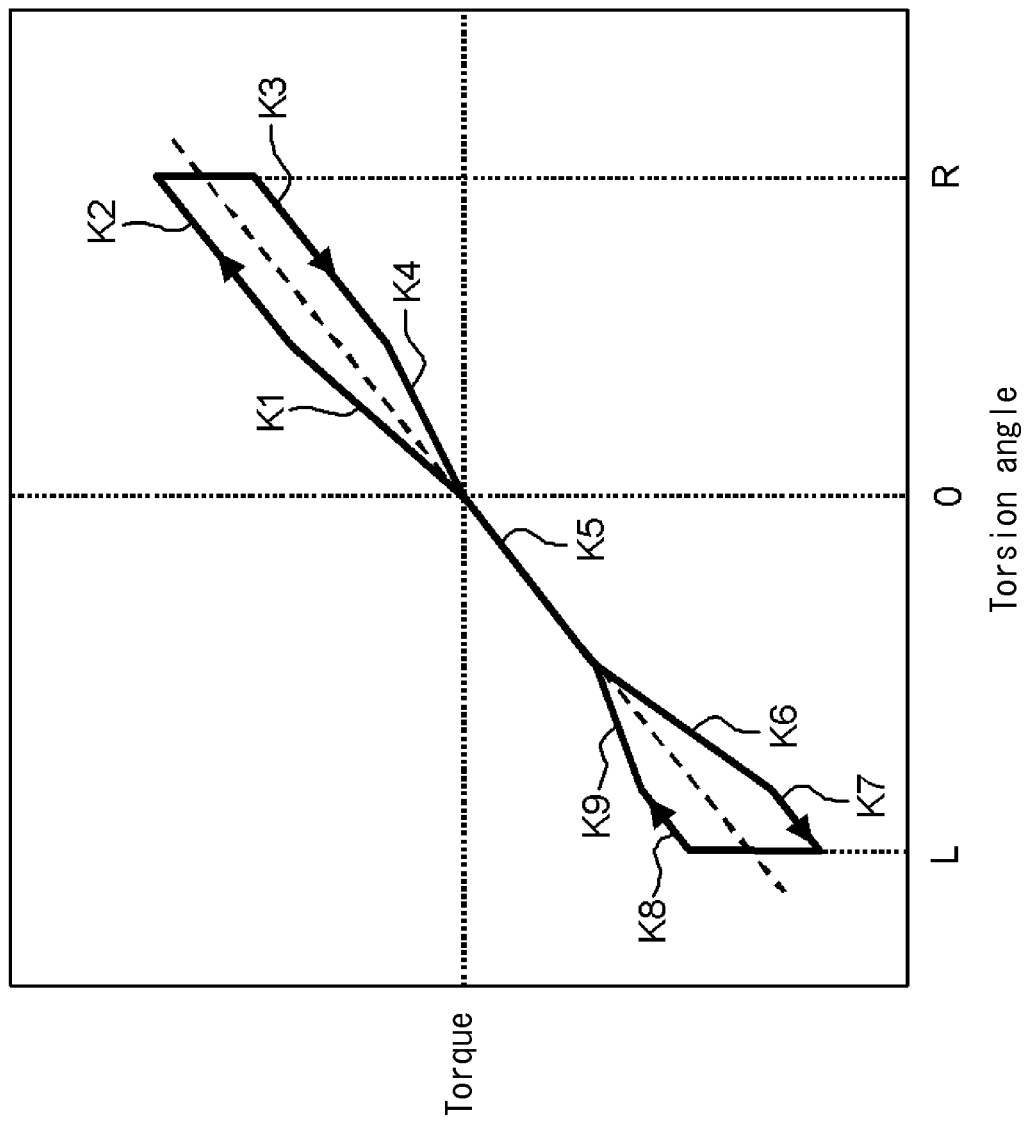
FIG. 10 is a view schematically illustrating a torsion characteristic of the torque fluctuation absorber according to the second embodiment.
Figure 11:
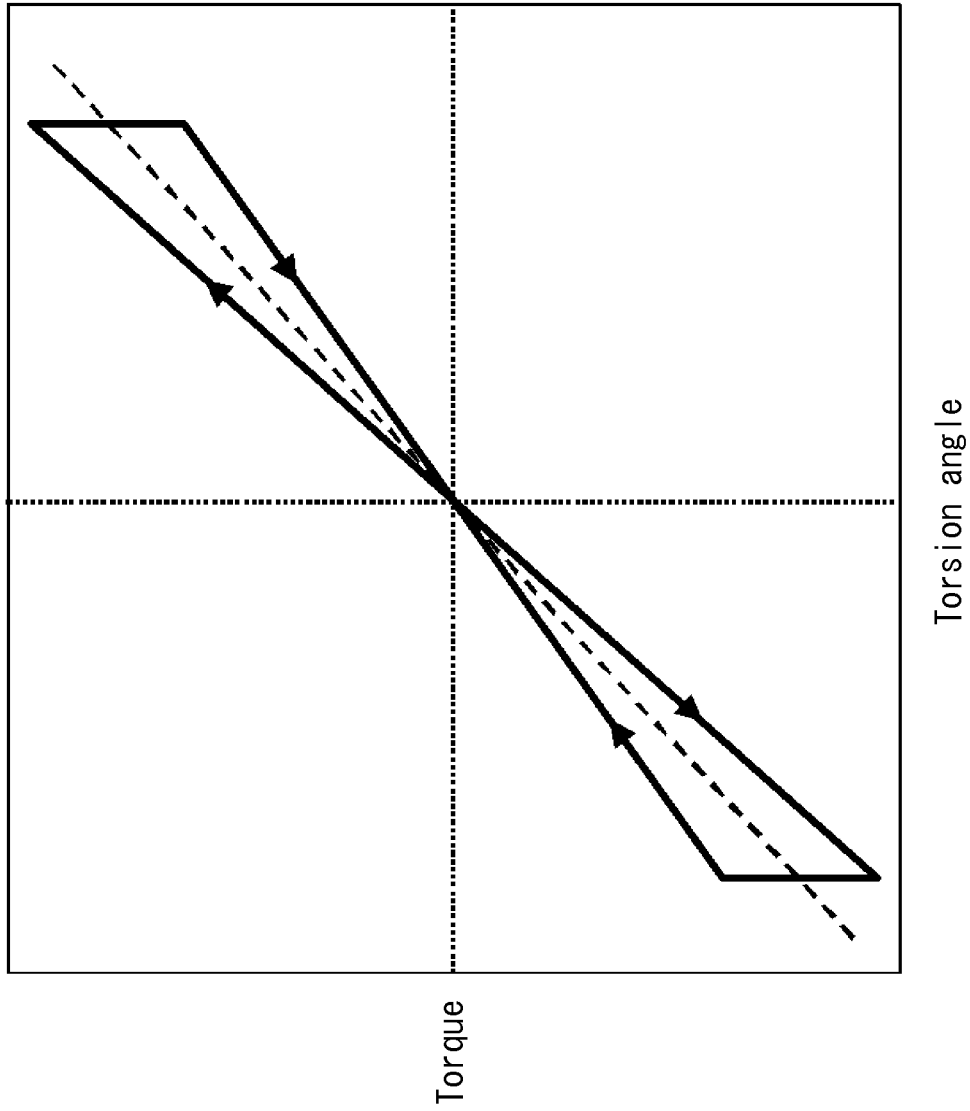
FIG. 11 is a view schematically illustrating a torsion characteristic of a known torque fluctuation absorber.

According to FIGS. 8A and 9A, in a case where the torsion is not generated at the hysteresis portion 3 (the torsion between the second side plate 12 and the flange portion 17*b*) in FIG. 1, the second thrust member 22 is pressed by the disc spring 23 to make contact with the control plate 18. Accordingly, the flat surface portion 18*p* of the control plate 18 and the flat surface portion 22*p* of the second thrust member 22 make contact with one another while the inclined surface portion 18*q* and the inclined surface portion 22*q* as well as the flat surface portion 18*r* and the flat surface portion 22*r* make contact with one another, respectively. Further, the inclined surface portion 18*s* and the inclined surface portion 22*s* as well as the flat surface portion 18*t* and the flat surface portion 22*t* make contact with one another, respectively.

Figure 8B:
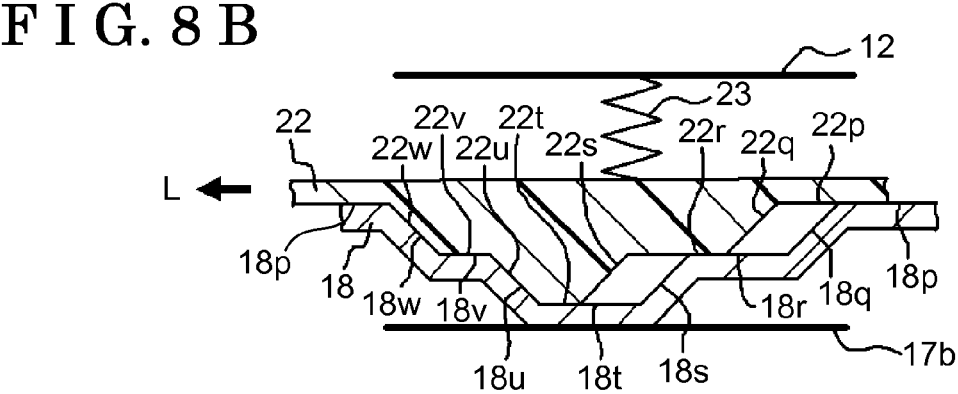
FIG. 8B is a cross-sectional view when the second thrust member is twisted in the L direction schematically illustrating the operation of the hysteresis portion of the torque fluctuation absorber according to the second embodiment.

In a case where the torsion is generated at the hysteresis portion 3 in FIG. 1 from a positioning of the control plate 18 and the second thrust member 22 shown in FIG. 8A, the second thrust member 22 (non-rotatable relative to the second side plate 12) twists in the L direction relative to the control plate 18 (non-rotatable relative to the flange portion 17*b*) until the second side plate 12 twists in the L direction relative to the flange portion 17*b* as shown in FIG. 8B. That is, the flat surface portion 18*p* of the control plate 18 and the flat surface portion 22*p* of the second thrust member 22 slide one another while the flat surface portion 18*r* and the flat surface portion 22*r* as well as the flat surface portion 18*t* and the flat surface portion 22*t* slide one another, respectively. On the other hand, the inclined surface portion 18*q* of the control plate 18 and the inclined surface portion 22*q* of the second thrust member 22 are separated while the inclined surface portion 18*s* and the inclined surface portion 22*s* are separated. Then, the inclined surface portion 18*u* and the inclined surface portion 22*u* make contact with one another while the inclined surface portion 18*w* and the inclined surface portion 22*w* make contact with one another. When the inclined surface portions 18 u, 22*u* and the inclined surface portions 18*w* and 22*w* make contact with one another, respectively, as shown in FIG. 8B, the second thrust member 22 is not axially displaced toward the second side plate 12 relative to the control plate 18, and accordingly, the pressure force of the second thrust member 22 by the disc spring 23 does not change while the hysteresis value does not change, or vary. When the positioning of the control plate 18 and the second thrust member 22 shown in FIG. 8A changes to a positioning of the control plate 18 and the second thrust member 22 shown in FIG. 8B, a change in a torsion characteristic of the torque fluctuation absorber 1 is indicated with line K5 in FIG. 10. When the positioning of the control plate 18 and the second thrust member 22 shown in FIG. 8B changes to the positioning of the control plate 18 and the second thrust member 22 shown in FIG. 8A, a change in a torsion characteristic of the torque fluctuation absorber 1 is indicated also with line K5 in FIG. 10.

Figure 8C:
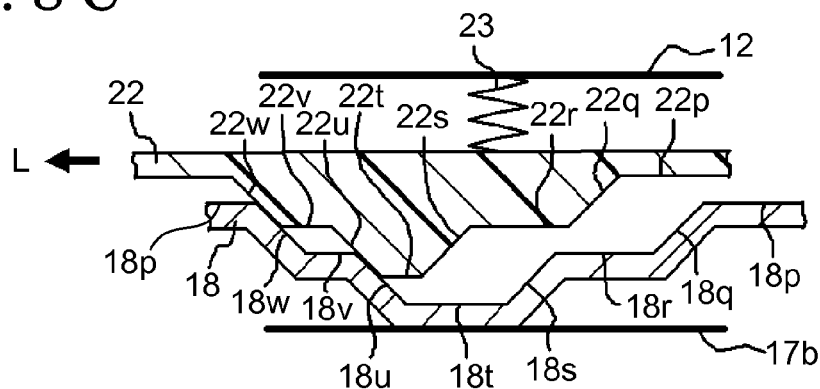
FIG. 8C is a cross-sectional view when the second thrust member is twisted in the L direction schematically illustrating the operation of the hytteresis portion of the torque fluctuation absorber according to the second embodiment.

In a case where the torsion is generated at the hysteresis portion 3 in FIG. 1 from the positioning of the control plate 18 and the second thrust member 22 shown in FIG. 8B and the second side plate 12 twists in the L direction relative to the flange portion 17*b*, the second thrust member 22 (non-rotatable relative to the second side plate 12) twists in the L direction relative to the control plate 18 (non-rotatable relative to the flange portion 17*b*) as shown in FIG. 8C. That is, the inclined surface portion 18*u* of the control plate 18 and the inclined surface portion 22*u* of the second thrust member 22 slide one another, that is, the inclined surface portion 22*u* slides onto the inclined surface portion 18*u*, while the inclined surface portion 18*w* and the inclined surface portion 22*w* slide one another. On the other hand, the flat surface portion 18*t* and the flat surface portion 22*t* are separated while the flat surface portion 18*v* and the flat surface portion 22*v* are separated. When the flat surface portions 18*t*, 22*t* and the flat surface portions 18*v*, 22*v* are separated one another, respectively, as shown in FIG. 8C, the second thrust member 22 is axially displaced toward the second side plate 12 relative to the control plate 18, and accordingly, the disc spring 23 is compressed between the second thrust member 22 and the second side plate 12. Thus, the pressing force of the second thrust member 22 by the disc spring 23 increases while the hysteresis value increases. When the positioning of the control plate 18 and the second thrust member 22 shown in FIG. 8B changes to a positioning of the control plate 18 and the second thrust member 22 shown in FIG. 8C, a change in a torsion characteristic of the torque fluctuation absorber 1 is indicated with line K6 in FIG. 10. When the positioning of the control plate 18 and the second thrust member 22 shown in FIG. 8C changes to the positioning of the control plate 18 and the second thrust member 22 shown in FIG. 8B, a change in a torsion characteristic of the torque fluctuation absorber 1 is indicated with line K9 in FIG. 10. That is, the second thrust member 22 is axially displaced toward the flange portion 17b relative to the control plate 18, and accordingly, the contraction rate of the disc spring 23 arranged between the second thrust member 22 and the second side plate 12 in the axial direction is decreased. Thus, the pressure force of the second thrust member 22 by the disc spring 23 decreases resulting in that the hysteresis value decreases.

Figure 8D:
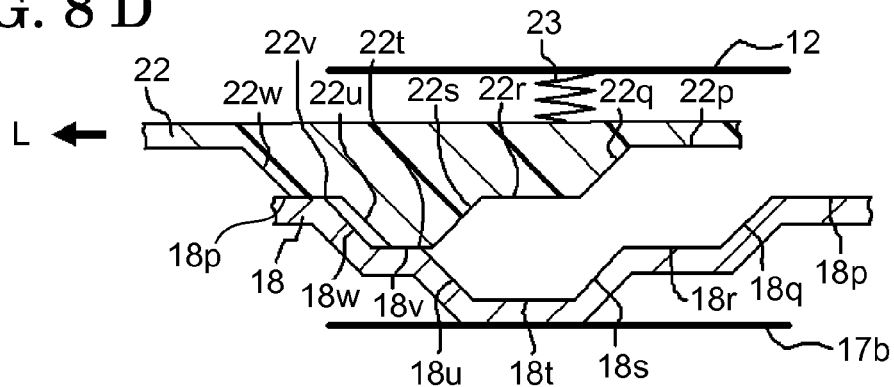
FIG. 8D is a cross-sectional view when the second thrust member is twisted in the L direction schematically illustrating the operation of the hysteresis portion of the torque fluctuation absorber according to the second embodiment.

In a case where the torsion is generated at the hysteresis portion 3 in FIG. 1 from the positioning of the control plate 18 and the second thrust member 22 shown in FIG. 8C and the second side plate 12 twists in the L direction relative to the flange portion 17b, the inclined surface portion 18u of the control plate 18 and the inclined surface portion 22u of the second thrust member 22 are separated while the inclined surface portion 18w and the inclined surface portion 22w are separated as shown in FIG. 8D. After the inclined surface portion 18u and the inclined surface portion 22u as well as the inclined surface portion 18w and the inclined surface portion 22w are separated respectively, the second thrust member 22 (non-rotatable relative to the second side plate 12) twists in the L direction relative to the control plate 18 (non-rotatable relative to the flange portion 17b) while the flat surface portion 18v of the control plate 18 and the flat surface portion 22t of the second thrust member 22 as well as the flat surface portion 18p and the flat surface portion 22v slide one another. When the flat surface portions 18v, 22t and the flat surface portions 18p, 22v slide one another, respectively, as shown in FIG. 8D, the second thrust member 22 is not axially displaced toward the second side plate 12 relative to the control plate 18, and accordingly, the pressing force of the second thrust member 22 by the disc spring 23 does not change while the hysteresis value does not change, or vary. In a case where the second thrust member 22 twists in the L direction relative to the control plate 18, the inclined surface portion 18w of the control plate 18 and the inclined surface portion 22u of the second thrust member 22 do not make contact with one another because the stopper portions (the projections 10a and 17e in FIG. 2) restrict the excessive torsion. When the positioning of the control plate 18 and the second thrust member 22 shown in FIG. 8C changes to a positioning of the control plate 18 and the second thrust member 22 shown in FIG. 8D, a change in a torsion characteristic of the torque fluctuation absorber 1 is indicated from line K6 to line K7 in FIG. 10. When the positioning of the control plate 18 and the second thrust member 22 shown in FIG. 8D changes to a positioning of the control plate 18 and the second thrust member 22 shown in FIG. 8C, a change in a torsion characteristic of the torque fluctuation absorber 1 is indicated from line K8 to line K9 in FIG. 10.

Figure 9B:
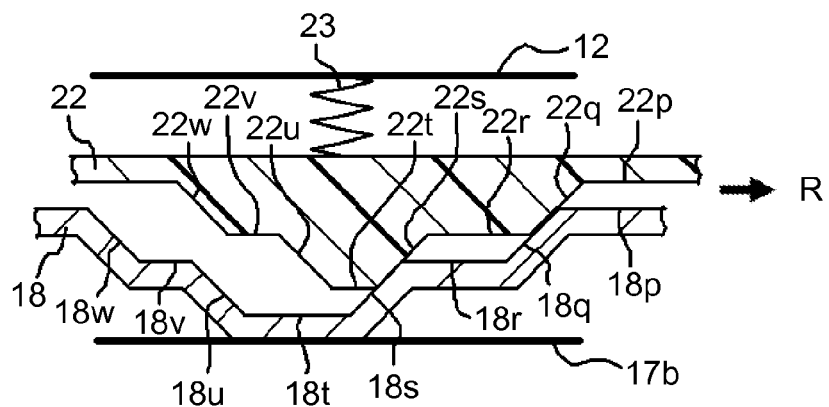
FIG. 9B is a cross-sectional view when the second thrust member is twisted in the R direction schematically illustrating the operation of the hysteresis portion of the torque fluctuation absorber according to the second embodiment.

In a case where the torsion is generated at the hysteresis portion 3 in FIG. 1 from a positioning of the control plate 18 and the second thrust member 22 shown in FIG. 9A and the second side plate 12 twists in the R direction relative to the flange portion 17b, the second thrust member 22 (non-rotatable relative to the second side plate 12) twists in the R direction relative to the control plate 18 (non-rotatable relative to the flange portion 17b) as shown in FIG. 9B. That is, the inclined surface portion 18q of the control plate 18 and the inclined surface portion 22q of the second thrust member 22 slide one another while the inclined surface portion 18s and the inclined surface portion 22s slide one another. On the other hand, the flat surface portion 18r and the flat surface portion 22r are separated while the flat surface portion 18t and the flat surface portion 22t are separated. When the flat surface portions 18r, 22r and the flat surface portions 18t, 22t are separated one another, respectively, as shown in FIG. 9B, the second thrust member 22 is axially displaced toward the second side plate 12 relative to the control plate 18, and accordingly, the disc spring 23 arranged between the second thrust member 22 and the second side plate 12 in the axial direction is contracted. Thus, the pressing force of the second thrust member 22 by the disc spring 23 increases resulting in that the hysteresis value increases. When the positioning of the control plate 18 and the second thrust member 22 shown in FIG. 9A changes to a positioning of the control plate 18 and the second thrust member 22 shown in FIG. 9B, a change in a torsion characteristic of the torque fluctuation absorber 1 is indicated with line K1 in FIG. 10. When the positioning of the control plate 18 and the second thrust member 22 shown in FIG. 9B changes to the positioning of the control plate 18 and the second thrust member 22 shown in FIG. 9A, a change in a torsion characteristic of the torque fluctuation absorber 1 is indicated with line K4 in FIG. 10. That is, the second thrust member 22 is axially displaced toward the flange portion 17b relative to the control plate 18, and accordingly, the contraction rate of the disc spring 23 arranged between the second thrust member 22 and the second side plate 12 in the axial direction is decreased. Thus, a pressure force of the second thrust member 22 by the disc spring 23 decreases resulting in that the hysteresis value decreases.

Figure 9C:
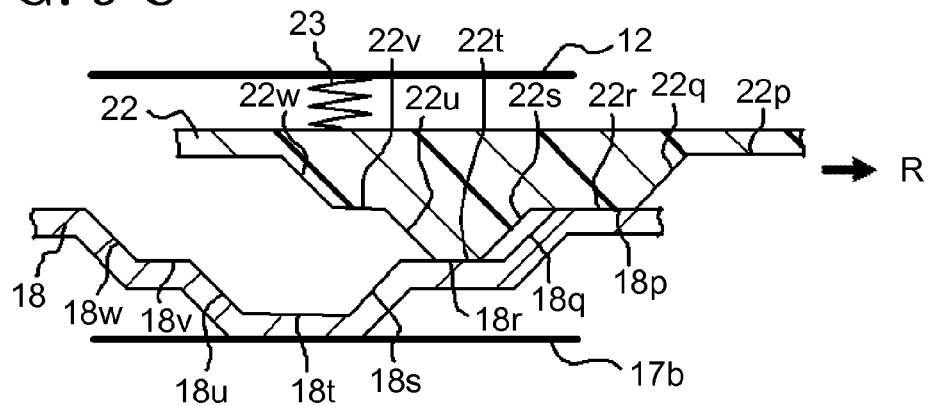
FIG. 9C is a cross-sectional view when the second thrust member is twisted in the R direction schematically illustrating the operation of the hysteresis portion of the torque fluctuation absorber according to the second embodiment.

In a case where the torsion is generated at the hysteresis portion 3 in FIG. 1 from the positioning of the control plate 18 and the second thrust member 22 shown in FIG. 9B and the second side plate 12 slides in the R direction relative to the flange portion 17b, the inclined surface portion 18s of the control plate 18 and the inclined surface portion 22s of the second thrust member 22 are separated while the inclined surface portion 18q and the inclined surface portion 22q are separated as shown in FIG. 9C. After the inclined surface portion 18s and the inclined surface portion 22s as well as the inclined surface portion 18q and the inclined surface portion 22q are separated respectively, the second thrust member 22 (non-rotatable relative to the second side plate 12) twists in the R direction relative to the control plate 18 (non-rotatable relative to the flange portion 17b) while the flat surface portion 18p of the control plate 18 and the flat surface portion 22r of the second thrust member 22 as well as the flat surface portion 18r and the flat surface portion 22t slide one another. When the flat surface portions 18p, 22r and the flat surface portion 18r, 22t slide one another, respectively, as shown in FIG. 9C, the second thrust member 22 is not axially displaced toward the second side plate 12 relative to the control plate 18, and accordingly, the pressure force of the second thrust member 22 by the disc spring 23 does not change while the hysteresis value does not change, or vary. In a case where the second thrust member 22 twists in the R direction relative to the control plate 18, the inclined surface portion 18q of the control plate 18 and the inclined surface portion 22s of the second thrust member 22 do not make contact with one another because the stopper portions (the projections 10a and 17e in FIG. 2) restrict the excessive torsion. When the positioning of the control plate 18 and the second thrust member 22 shown in FIG. 9B changes to a positioning of the control plate 18 and the second thrust member 22 shown in FIG. 9C, a change in a torsion characteristic of the torque fluctuation absorber 1 is indicated from K1 to line K2 in FIG. 10. When the positioning of the control plate 18 and the second thrust member 22 shown in FIG. 9C changes to the positioning of the control plate 18 and the second thrust member 22 shown in FIG. 9B, a change in a torsion characteristic of the torque fluctuation absorber 1 is indicated from line K3 to line K4 in FIG. 10

According to the second embodiment, in addition to achieving the same effects as those of the first embodiment, various target values may be supported because the hysteresis may be multi-leveled by changing inclined angles of sliding surfaces.

According to the first and second embodiments, the sliding surfaces of the second thrust member 22 and the control plate 18 are formed by a combination of the flat surfaces and the inclined surfaces (flat inclined surfaces), however is not limited to this. The surfaces may be freely determined and for example, a curved surface may be applied. Further, the hysteresis may not only be multi-leveled but also be non-leveled by applying the curved surface to achieve a smooth hysteresis torque transition.

According to the aforementioned embodiment, the torque fluctuation absorber includes the second side plate 12, the hub member 17 arranged coaxially with the second side plate 12, the control plate 18 arranged between the second side plate 12 and the hub member 17 in the axial direction and engaging non-rotatably with the hub member 17, the second thrust member 22 arranged between the second side plate 12 and the control plate 18 in the axial direction, engaging with the second side plate 12 in the axially movable and non-rotatable manner, and slidably making contact with the control plate 18, and the disc spring 23 arranged between the second side plate 12 and the second thrust member 22 in the axial direction, supported by the second side plate 12 and pressing the second thrust member 22 against the control plate 18. Each sliding surface of the second thrust member 22 and the control plate 18 is formed in a predetermined shape to axially displace the second thrust member 22 relative to the control plate 18, to change a pressure load of the disc spring 23, and to change, or vary the hysteresis value generated between the second thrust member 22 and the control plate 18 when the torsion is generated between the second thrust member 22 and the control plate 18.

According to the above-described structure, as the torque fluctuation absorber 1 is configured to generate the change, or variance in the hysteresis value in accordance with the torsion direction and the torsion angle by changing the form of an each sliding surface of the control plate 18 and the second thrust member 22, the configurations of the torque fluctuation absorber 1 other than the control plate 18 and the second thrust member 22 are not required to be complicated, resulting in that a strength of the torque fluctuation absorber 1 may be maintained. According to the embodiment, because the hysteresis value changes, or varies in accordance with the change in the form of each of the sliding surfaces of the control plate 18 and the second thrust member 22, the large frictional force may be generated. Further, according to the embodiment, by controlling the inclined angles, that is, by including different inclined angles, of each of the sliding surfaces of the control plate 18 and the second thrust member 22, any hysteresis value may be set to correspond to the torsion direction and the torsion angle.

According to the aforementioned embodiment, each of the sliding surfaces of the second thrust member 22 and the control plate 18 is formed asymmetrically to correspond to the torsion direction and the torsion angle between the second thrust member 22 and the control plate 18.

According to the aforementioned embodiment, each of the sliding surfaces of the second thrust member 22 and the control plate 18 is formed in which the inclined angle of each sliding surface changes in the circumferential direction.

According to the aforementioned embodiment, each of the sliding surfaces of the second thrust member 22 and the control plate 18 is formed by a combination of at least two portions of at least one flat surface portion orthogonal to the axial direction, at least one inclined surface portion inclined relative to the flat surface portion, and at least one curved portion.

According to the aforementioned embodiment, the control plate 18 is integrally formed with the hub member 17.

According to the aforementioned embodiment, the control plate 18 includes the flat surface portion and the inclined surface portions arranged at the circumferentially opposite sides of the flat surface portion, respectively, and the second thrust member 22 slides on the flat surface portion of the control plate 18 and slides onto one of the inclined surface portions of the control plate 18 to increase the pressure load of the disc spring 23

According to the aforementioned embodiment, the control plate 18 includes the flat surface portion and the inclined surface portions with different inclined angles arranged at the circumferentially opposite sides of the flat surface portion, respectively, and the second thrust member 22 slides on the flat surface portion of the control plate 18 and slides onto one of the inclined surface portions of the control plate 18 to increase the pressure load of the disc spring 23.

According to the aforementioned embodiment, the control plate 18 includes the plural flat surface portions and the inclined surface portions arranged at the circumferentially opposite sides of the flat surface portion, respectively, and the flat surface portions and the inclined surface portions are formed stepwise, and the second thrust member 22 slides on the flat surface portion of the control plate 18 and slides onto one of the inclined surface portion of the control plate 18, which are formed stepwise, in one of opposite directions to increase the pressure load of the disc spring 23.

According to the aforementioned embodiment, the control plate 18 includes the plural flat surface portions and the inclined surface portions formed with different inclined angles arranged at the circumferentially opposite sides of the flat surface portion, respectively, and the flat surface portions and the inclined surface portions are formed stepwise, and the second thrust member 22 slides on the flat surface portion of the control plate 18 and slides onto one of the inclined surface portion of the control plate 18, which are formed stepwise, in one of the opposite directions to increase the pressure load of the disc spring 23.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorber, comprising:
a first rotating member;
a second rotating member arranged coaxially with the first rotating member;
a control plate arranged between the first rotating member and the second rotating member in an axial direction and engaging non-rotatably with the second rotating member;

a thrust member arranged between the first rotating member and the control plate in the axial direction, the thrust member engaging with the first rotating member in an axially movable and non-rotatable manner, and slidably making contact with the control plate; and an elastic member arranged between the first rotating member and the thrust member in the axial direction, the elastic member supported by the first rotating member and pressing the thrust member against the control plate, wherein each sliding surface of the thrust member and the control plate is formed in a predetermined shape to axially displace the thrust member relative to the control plate, to change a pressure load of the elastic member, and to change a hysteresis value generated between the thrust member and the control plate when a torsion is generated between the thrust member and the control plate, wherein the control plate includes a plurality of flat surface portions and inclined surface portions arranged at circumferentially opposite sides of the flat surface portion, respectively, and the flat surface portions and the inclined surface portions are formed stepwise, and the thrust member slides on the flat surface portion of the control plate and the thrust member slides onto one of the inclined surface portion of the control plate, which are formed stepwise, in one of opposite directions to increase the pressure load of the elastic member.

2. The torque fluctuation absorber according to claim 1, wherein the each sliding surface of the thrust member and the control plate is formed asymmetrically to correspond to a torsion direction and a torsion angle between the thrust member and the control plate.

3. The torque fluctuation absorber according to claim 1, wherein the each sliding surface of the thrust member and the control plate is formed in which an inclined angle of the each sliding surface changes in a circumferential direction.

4. The torque fluctuation absorber according to claim 3, wherein the each sliding surface of the thrust member and the control plate is formed by a combination of at least two portions of at least one flat surface portion orthogonal to the axial direction, at least one inclined surface portion inclined relative to the flat surface portion, and at least one curved portion.

5. The torque fluctuation absorber according to claim 1, wherein the control plate engages non-rotatably with the second rotating member by a portion of the control plate being attached to a portion of the second rotating member or by the control plate being integrally formed with the second rotating member.

6. A torque fluctuation absorber, comprising:

a first rotating member;

a second rotating member arranged coaxially with the first rotating member;

a control plate arranged between the first rotating member and the second rotating member in an axial direction and engaging non-rotatably with the second rotating member;

a thrust member arranged between the first rotating member and the control plate in the axial direction, the thrust member engaging with the first rotating member in an axially movable and non-rotatable manner, and slidably making contact with the control plate; and an elastic member arranged between the first rotating member and the thrust member in the axial direction, the elastic member supported by the first rotating member and pressing the thrust member against the control plate, wherein each sliding surface of the thrust member and the control plate is formed in a predetermined shape to axially displace the thrust member relative to the control plate, to change a pressure load of the elastic member, and to change a hysteresis value generated between the thrust member and the control plate when a torsion is generated between the thrust member and the control plate, wherein the control plate includes a plurality of flat surface portions and inclined surface portions formed with different inclined angles arranged at circumferentially opposite sides of the flat surface portion, respectively, and the flat surface portions and the inclined surface portions are formed stepwise, and the thrust member slides on the flat surface portion of the control plate and the thrust member slides onto one of the inclined surface portion of the control plate, which are formed stepwise, in one of opposite directions to increase the pressure load of the elastic member.

* * * * *